Sept. 22, 1931.  G. S. BIRCH  1,824,388
COMBINATION LAMP AND VENTILATOR
Filed Feb. 11, 1930
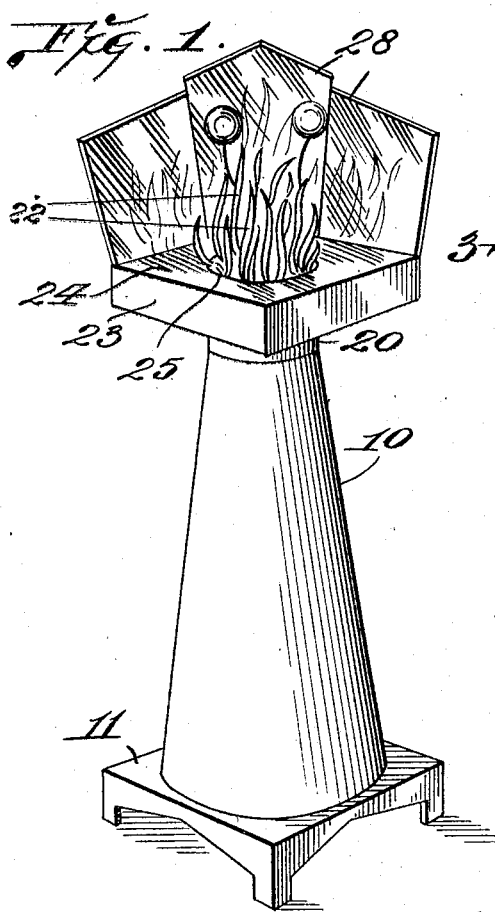
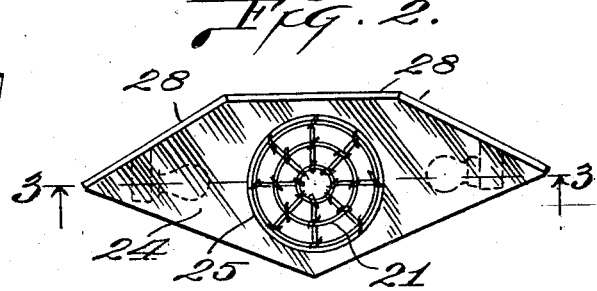
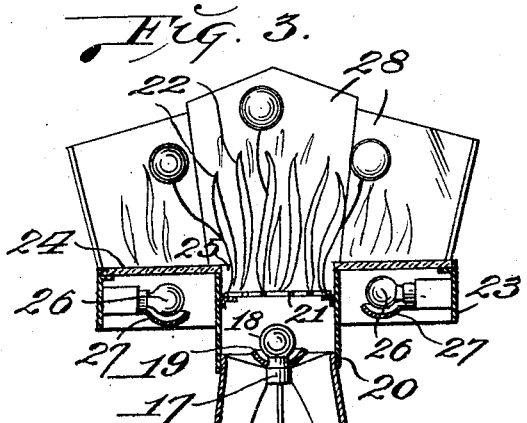
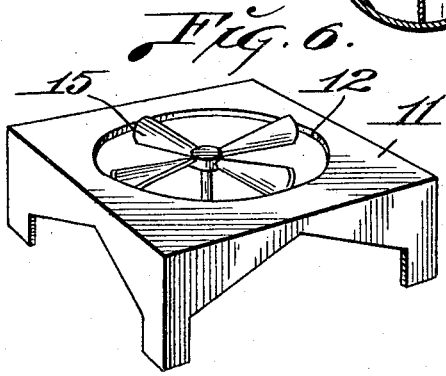
INVENTOR:—
GEORGE SERGE BIRCH.
By Martin P. Smith, ATTY.

Patented Sept. 22, 1931

1,824,388

UNITED STATES PATENT OFFICE

GEORGE SERGE BIRCH, OF TULSA, OKLAHOMA

COMBINATION LAMP AND VENTILATOR

Application filed February 11, 1930. Serial No. 427,514.

My invention relates to a combination lamp and ventilator and the principal object of my invention is, to combine in a unitary decorative structure, an electric lamp and an electric fan, which latter while in operation, forces a column of air upwardly through the body of the structure so as to produce and establish air circulation and consequent ventilation within the room in which the device is positioned.

Further objects of my invention are, to provide a combination lamp and ventilator that may be shaped and finished so as to provide a decorative structure of pleasing appearance and to arrange within the upper portion of the housing of the structure, a plurality of ribbons or narrow strips of thin flexible material, such as paper, celluloid or any other suitable material which, while the ventilating fan within the device is in operation, will be blown upwardly through the open upper end of the housing so as to give the appearance of flames and which appearance is enhanced by the rays from lamps contained within the upper portion of the housing and which rays pass upwardly between the ribbons or strips of thin fabric.

Further objects of my invention are, to provide a combination lamp and ventilator having an upper portion that is composed of transparent material such as glass and a plurality of reflecting surfaces and to associate therewith lamps so as to produce novel and pleasing lighting effects and further, to arrange on the interior of the main body of the structure, a plurality of fixed ribs or deflectors that will be instrumental in eliminating all tendency of the air current that is forced upwardly through the housing by the fan, to rotate or swirl as it issues from the upper end of the housing and discharges through the ribbons or narrow strips of flexible material that function as flame representing members.

Further objects of my invention are, to provide a series of substantially spherical inflated members such as toy balloons or the like and to secure the same by flexible members such as cords to the upper portion of the ventilator so that said buoyant members will be blown upwardly and caused to vibrate or swing from side to side by the current of air passing upwardly through the ventilator and further, to provide means for imparting fragrance to the air that circulates through the ventilator or to impregnate the column of air with a deodorizing vapor or the like.

With the foregoing and other objects in view, my invention consists in certain novel features of construction and arrangement of parts that will hereinafter be more fully described and claimed and illustrated in the accompanying drawings, in which:

Fig. 1 is a perspective view of a combination lamp and ventilator embodying the principles of my invention.

Fig. 2 is a top plan view of the combination lamp and ventilator.

Fig. 3 is a vertical section taken on the line 3—3 of Fig. 2.

Fig. 4 is a horizontal section taken on the line 4—4 of Fig. 3.

Fig. 5 is a plan view of a modified form of the carrier for the ribbons or flame representing members.

Fig. 6 is a perspective view of the base that supports the fan or air propeller and the housing through which the column of air passes.

Referring by numerals to the accompanying drawings which illustrate a practical embodiment of my invention, 10 designates an upright housing which may be formed of any suitable material, for instance, wood, metal or vitrified earth material such as terra cotta or porcelain and this housing may be of any desired size and shape and finished or decorated as desired.

The lower end of the housing 10 rests on a base 11 that may be formed of wood, metal or any other suitable material and which base may be of any desired size and shape.

Formed in the center of base 11 is an opening 12 and suitably arranged within the base below this opening is a frame or spider 13 that carries a small electric motor 14.

Mounted on the upper end of the vertical shaft of this motor is a horizontally disposed fan or propeller 15 that occupies the opening 12 in the top of the base and said fan or propeller while in operation forces a column of air upwardly through the housing 10.

In order to prevent the twisting or swirling of the column of air that passes upwardly through the housing, a plurality of relatively narrow strips 16 of suitable thin material are secured on the inner surface of housing 10 and said strips extend in straight longitudinal lines downwardly from the top of said housing and the lower portions of said strips are curved or inclined in the direction opposite to the direction in which the fan rotates. Thus said strips function as deflectors to counteract any tendency of the column of air to twist or rotate as it travels upwardly through the housing and discharges from the upper end thereof.

Secured in any suitable manner to the upper inner edges of the deflectors 16 is a socket 17 that receives an electric lamp 18 and positioned immediately beneath the bulb of said lamp is a small concave reflector 19.

Removably positioned on the upper end of the housing 10 is a short vertically disposed tubular member 20 and removably positioned within said member is a frame 21 that functions as a carrier and said frame may be of any suitable construction, for instance, a plurality of concentric rings or wire that are connected by radial wires, as illustrated in Fig. 2, or said carrier may be a single ring, as illustrated in Fig. 5.

Secured to this removable carrier are the lower ends of short pieces of ribbon or narrow strips of thin flexible material 22 such as fabric, paper, celluloid or any other suitable material and the upper ends of these strips or ribbons are preferably pointed. These strips or ribbons 22, when blown upwardly as a result of the air current that is forced upwardly through housing 10 by fan 15 will wave and vibrate through the open upper end of tubular member 20, thereby giving the appearance of flames. To enhance the appearance of flames, the ribbons or strips of flexible material may be suitably colored, for instance, different shades of red, yellow, blue or green.

In some instances the removable carrier 21 may be dispensed with and the lower ends of the flame representing members 22 are secured directly to the inner face of the wall of tubular member 20.

Supported by and surrounding the upper portion of tubular member 20 is a housing of polygonal or any other desired shape, and which housing comprises side walls 23 and a top wall or plate 24 of transparent material, preferably glass, and in the center of which is formed an opening 25 that registers with the opening through tubular member 20.

Suitably mounted within the housing beneath the transparent plate 24, are electric lamps 26, beneath which are positioned concave reflectors 27.

The bulbs of lamps 26, as well as the lamp 18, that is positioned in the upper portion of housing 10, may be distinctively and differently colored.

Suitably secured to the rear portion of housing and projecting upwardly therefrom is a plurality of mirrors 28 or flat members provided with reflecting surfaces and which members occupy angular positions relative to each other.

The electric lamps and motor that are associated with the structure may be located in the same circuit or in separate circuits as desired.

When current is supplied to the motor and the electric lamps the latter will be lighted and as each lamp is provided with a reflector the greater portion of the rays from the lamps will be directed upwardly, thereby illuminating the flame representing members and likewise illuminating the transparent plate 24 and the reflecting surfaces to the rear thereof. The fan or propeller 15 rotating in a horizontal plane will produce and force a current of air upwardly through housing 10 and the short tubular member 20 and this current of air will blow the flame representing members 22 upwardly through the opening 25 in transparent plate 24, thus giving the appearance of flames and this appearance is greatly enhanced by the rays of light from lamp 18 that strike against the vibrating flame representing members. The vibrating flame representing members will be reflected in the mirrors or reflecting surfaces 28 and as these surfaces are illuminated by lamps 26 a very novel and pleasing effect is produced.

The current of air produced through the housing of the device serves to circulate the air through the room in which the combined lamp and ventilator is positioned and such current of air necessarily establishes and maintains ventilation through the room.

Thus it will be seen that I have provided a relatively simple and practical structure that includes a ventilator or air circulating medium and a decorative lamp and which structure may be of any desired size and form, with its external surfaces finished and decorated as desired.

The device, in addition to serving as a decorative lamp or ventilator, may be employed as a window display, for the interior or exterior decoration of buildings, as an advertising medium for sign boards, or any other advertising purposes.

The housing forming the body of the combined lamp and ventilator may be suitably supported from a wall, suspended from the ceiling or from an overhead hanger or it may be mounted on a standard after the manner of the conventional floor lamps. Further, the structure may be built and arranged so that the same will force a current of air downwardly, horizontally, or at any angle.

If desired a number of small substantially spherical inflated members 29 such as toy balloons may be secured by threads to the carrier 21, thus producing novel effects when said balloons are blown upwardly in front of the reflecting surfaces and if desired suitable means for producing smoke may be arranged on the interior of the housing and the smoke blown upwardly through the vibrating flame representing members. By providing a suitable holder 30 within the housing 10 incense may be burned within the housing and the smoke and perfume from such burning incense will be carried by the air current upwardly through the structure into the room in which said structure is located. If desired suitable substances may be burned within the container 30 to ozonize or deodorize the column of air that passes upwardly through housing 10.

By fitting the motor 19 with suitable antifriction bearings, the operation of the fan is rendered practically noiseless and the fan may be provided with any number of blades.

In order to add to the attractiveness of the device, several screens or frames carrying differently colored flame representing members may be supplied with each housing and these frames or screens are interchangeably used so as to produce different flame effects.

In some instances it may be found desirable to arrange the ventilating fan within the housing above the electric lamp.

It should be understood that wherever in this specification, reference is made to a fan, ventilating fan or air propeller such terms comprehend a ventilating fan as well as an exhaust fan or any other practical means of creating an air flow through the housing.

Various changes in the size, form and construction of the various parts of my improved combination lamp and ventilator may be made and substituted for those herein shown and described without departing from the spirit of my invention, the scope of which is set forth in the appended claims.

I claim as my invention:

1. In a combined lamp and ventilator, a housing, a plurality of flame representing members arranged in one end of said housing, means for establishing and maintaining a flow of air through said housing, a reflector arranged on said housing adjacent to the end in which the flame representing members are located and means for illuminating said flame representing members and reflector.

2. In a combined lamp and ventilator, a housing, a plurality of flame representing members arranged in the upper portion of said housing, means for establishing and maintaining a flow of air upwardly through said housing, a plurality of reflectors arranged to the rear of the upper end of said housing, means for illuminating the flame representing members and means for illuminating the faces of said reflectors.

3. In a combined illuminating and air moving device, a body member, a plurality of flame representing members arranged at the end of said body member, means for producing a flow of air through said member, a reflector arranged exteriorly of said member and means for illuminating said flame representing members and reflector.

4. In a combined illuminating and air moving device, a body member, a plurality of movable members arranged at one end of said body member, means for producing a flow of air through said body member for imparting motion to said movable members, a reflector arranged exteriorly of said body member, means for illuminating said movable members and means for illuminating said reflector.

5. In a combined lamp and ventilator, a housing, means for producing a flow of air through said housing, a plurality of substantially spherical members loosely connected to the end of the housing from which the current of air discharges, a reflector arranged on the housing adjacent to the discharge end thereof and means for illuminating said spherical members and reflector.

6. In a combined lamp and air moving device, a housing, means for producing a flow of air through said housing, a plurality of substantially spherical members flexibly connected to the end of the housing from which the current of air discharges, a reflector on the housing adjacent to the discharge end thereof, means for illuminating said spherical members and means for illuminating said reflector.

7. A device of the character described, comprising a housing, a plurality of movable members arranged at one end of said housing, means for producing a flow of air through the housing for imparting motion to said movable members and means arranged exteriorly of the housing for reflecting the images of said movable members.

8. In a device of the character referred to, an open mesh screen, a plurality of movable members connected to said screen, means for producing a current of air through said screen and means adjacent to said screen for reflecting the images of said movable members.

9. In a device of the class described, a housing, a support adjacent to one end of said housing, a plurality of movable members connected to said support, means for producing a flow of air through said housing to impart movement to said movable members and means arranged exteriorly of the housing for reflecting the images of said movable members while in motion.

In testimony whereof I affix my signature.

GEORGE SERGE BIRCH.